(12) United States Patent
Fukushima

(10) Patent No.: US 10,120,621 B2
(45) Date of Patent: Nov. 6, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kentaro Fukushima, Mitaka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/600,448

(22) Filed: May 19, 2017

(65) Prior Publication Data

US 2017/0343915 A1 Nov. 30, 2017

(30) Foreign Application Priority Data

May 30, 2016 (JP) .................................. 2016-107946
Mar. 15, 2017 (JP) .................................. 2017-050005

(51) Int. Cl.
| | |
|---|---|
| *H04N 1/04* | (2006.01) |
| *G06F 3/12* | (2006.01) |
| *B41J 2/01* | (2006.01) |
| *G03G 15/00* | (2006.01) |

(52) U.S. Cl.
CPC .............. *G06F 3/1212* (2013.01); *B41J 2/01* (2013.01); *G03G 15/5062* (2013.01); *G03G 15/5083* (2013.01); *G03G 15/5087* (2013.01); *G03G 15/55* (2013.01); *G06F 3/1244* (2013.01)

(58) Field of Classification Search
CPC ........... G06K 15/02; G06K 2215/0065; H04N 1/00204; H04N 1/32358; H04N 1/40; H04N 2201/001; H04N 2201/0074; H04N 2201/3297
USPC ................. 345/501, 520; 358/1.15, 448, 530
See application file for complete search history.

(56) References Cited

U.S. PATENT DOCUMENTS

| | | | | |
|---|---|---|---|---|
| 6,292,202 | B1 * | 9/2001 | Nishio | G06K 15/02 345/501 |
| 7,365,865 | B2 * | 4/2008 | Kidani | H04N 1/46 347/115 |
| 8,049,933 | B2 * | 11/2011 | Murakami | H04N 1/00838 283/902 |
| 8,363,251 | B2 * | 1/2013 | Watanabe | H04N 1/4052 358/1.15 |
| 8,467,078 | B2 * | 6/2013 | Aritomi | H04N 1/00912 358/1.14 |

(Continued)

FOREIGN PATENT DOCUMENTS

JP 9-193480 7/1997

*Primary Examiner* — Negussie Worku
(74) *Attorney, Agent, or Firm* — Fitzpatrick, Cella, Harper & Scinto

(57) ABSTRACT

A generation unit configured to receive image data and to generate print data from received image data; a printing control unit configured to form an image on a sheet based on print data generated by the generation unit; a determination unit configured to determine whether or not a delay in generation of the print data has occurred based on a data amount of the received image data and a data amount of print data generated by the generation unit; and an issuance unit configured to issue a command to insert an auxiliary pattern in a case where the determination unit determines that the delay has occurred are included.

19 Claims, 9 Drawing Sheets

(56) References Cited

U.S. PATENT DOCUMENTS

| | | | | |
|---|---|---|---|---|
| 8,665,458 B2* | 3/2014 | Ozawa | ............... | G06K 15/02 |
| | | | | 358/1.13 |
| 8,746,821 B2* | 6/2014 | Miura | ............... | G06F 3/121 |
| | | | | 347/14 |
| 8,792,127 B2* | 7/2014 | Matsuda | ............ | G06K 15/12 |
| | | | | 358/1.13 |
| 2004/0174180 A1* | 9/2004 | Fukushima | ....... | G01R 31/2889 |
| | | | | 324/756.05 |
| 2006/0223470 A1* | 10/2006 | Uchikawa | ............ | H04B 1/40 |
| | | | | 455/234.1 |
| 2012/0200865 A1* | 8/2012 | Sakurai | ............... | B42C 19/00 |
| | | | | 358/1.9 |
| 2014/0268227 A1* | 9/2014 | Nakata | ............ | H04N 1/00233 |
| | | | | 358/1.15 |
| 2015/0147073 A1* | 5/2015 | Nonaka | ............ | G03G 15/502 |
| | | | | 399/21 |
| 2017/0346956 A1* | 11/2017 | Nakamura | ......... | G06F 3/1236 |

* cited by examiner

IMAGE PROCESSING APPARATUS, IMAGE PROCESSING METHOD, AND STORAGE MEDIUM

BACKGROUND OF THE INVENTION

Field of the Invention

The present invention relates to a technique to receive a print job from an external device and to form an image on a sheet based on the received print job.

Description of the Related Art

Conventionally, for an image forming apparatus, such as a commercial high-speed printer, a technique is known which conveys a cut sheet fed from a sheet feed unit by causing the next cut sheet to follow the preceding cut sheet. With this technique, it is possible to shorten the time required to print a plurality of pages compared to the method in which a sheet for the next page is fed after the discharge of the sheet for the previous page on which an image is formed is completed. In the present specification, performing a series of operations to feed a sheet, to perform printing, and to discharge a sheet in parallel at the time of performing printing of a plurality of pages as described above is referred to as continuous printing. The continuous printing is also applied at the time of performing printing based on a plurality of jobs. In the case where the print settings (e.g., sheet size, sheet type, and so on) of a plurality of print jobs are the same, printing is performed by the continuous printing without suspending sheet feed at the boundary between a print job and the next print job.

It is desirable to perform continuous printing in the case where printing of a large number of pages is necessary commercially. However, in the image forming apparatus that performs continuous printing, in the case where the preparation of data to be transmitted to a printer engine (in the present specification, called print data) is not completed in time (so-called "data out" occurs), there is such a problem that printing processing is obliged to suspend. Further, in recent years, the resolution of the image forming apparatus has increased, and therefore, the size of image data transmitted from an external device, such as a host computer, to the image forming apparatus has also increased. As a result of this, in the image forming apparatus, the time required to prepare print data to be transmitted to a printer engine lengthens and the case where the preparation of print data is not completed in time and the printing processing is obliged to suspend tends to occur.

Japanese Patent Laid-Open No. H09-193480 (1997) has disclosed an image forming apparatus that compares the reception speed of image data with the printing speed and in the case where the reception speed is lower, performs control so that a state where it is possible to start printing is set as well as standing by until a predetermined amount of print data is accumulated in a storage unit. With the image forming apparatus of Japanese Patent Laid-Open No. H09-193480 (1997), it is possible to reduce a risk of printing suspension while suppressing printing efficiency from decreasing.

However, there is such a problem that the image forming apparatus of Japanese Patent Laid-Open No. H09-193480 (1997) requires special control (control to suspend the printer engine or to cause the printer engine to operate again) for the printer engine in order to prevent printing suspension and that the control configuration is complicated.

The present invention has been made in light of the above-described problem and an object is to provide an image processing apparatus and an image processing method capable of preventing printing suspension while implementing high productivity of printed products without requiring special control for a printer engine.

SUMMARY OF THE INVENTION

The image processing apparatus according to the present invention includes: a generation unit configured to receive image data and to generate print data from received image data; a printing control unit configured to form an image on a sheet based on print data generated by the generation unit; a determination unit configured to determine whether or not a delay in generation of the print data has occurred based on a data amount of the received image data and a data amount of print data generated by the generation unit; and an issuance unit configured to issue a command to insert an auxiliary pattern in a case where the determination unit determines that the delay has occurred.

Further features of the present invention will become apparent from the following description of exemplary embodiments with reference to the attached drawings.

DESCRIPTION OF THE EMBODIMENTS

In the following, with reference to the attached drawings, preferred embodiments of the present invention are explained in detail as examples. However, the relative arrangement of the components, the shapes of apparatuses and devices and the like described in the embodiments are merely exemplary and are not intended to limit the scope of the present invention only to those.

In the present embodiment, it is assumed that the "image forming apparatus" is not limited to a dedicated apparatus or device specialized in the printing function, but includes a multi function peripheral that combines the printing function and other functions, a manufacturing device that forms an image or a pattern on a printing medium, and so on.

First Embodiment

In the present embodiment, an image forming apparatus capable of suppressing the suspension of the printing operation is described. In the case where it is determined that a delay in image processing (delay in generation of print data) has occurred in the image forming apparatus of the present embodiment, the suspension of the printing operation is suppressed by dynamically inserting a pattern for maintenance so that the printing operation is performed in time.

Figure 1:
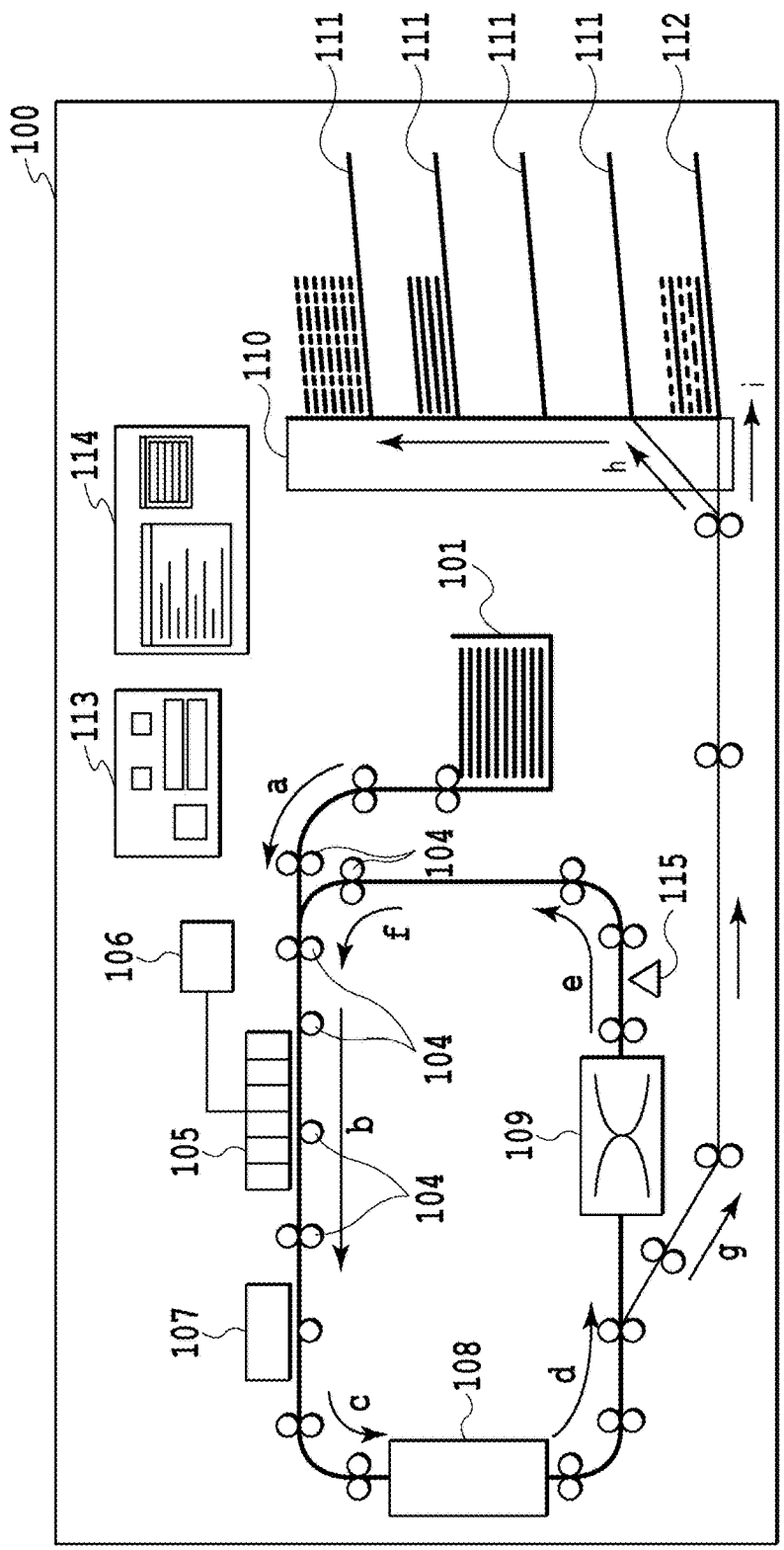
FIG. 1 is a cross section diagram showing an entire configuration of an image forming apparatus in a first embodiment.

FIG. 1 is a cross section diagram showing the entire configuration of the image forming apparatus in the present embodiment. An image forming apparatus 100 is an image forming apparatus that forms an image on a sheet (hereinafter, a cut sheet) whose size has been cut to a predetermined size, such as the L size, A4, and A3. The image forming apparatus 100 includes a sheet feed tray 101, a rotary roller 104, a print head 105, an ink tank 106, and a scanner unit 107. The image forming apparatus in the present embodiment is compatible with printing of cut sheets of a variety of sheet sizes and sheet types and has a plurality of sheet feed trays. For simplicity, FIG. 1 shows one sheet feed tray on which a plurality of cut sheets having the same sheet size and the same sheet type is set. The image forming apparatus 100 further includes a drying unit 108, a reversion unit 109, a sort unit 110, a control unit 113, and an operation unit 114. The control unit 113 is a unit including a controller consisting of a CPU, a ROM, a RAM, and so on, and various I/O interfaces and governs the control of the entire image forming apparatus 100.

A sheet pulled out of the sheet feed tray 101 advances in the direction of an arrow a by the rotary roller 104 that is driven by motor control. After this, the sheet advances in the direction of an arrow b and passes under the print head 105.

In the print head 105, independent ink jet heads corresponding to a plurality of colors (in the present embodiment, six colors) are held along the sheet conveyance direction. In synchronization with the sheet conveyance, ink is ejected from the print head 105 and an image is formed on a sheet.

The ink tank 106 independently stores each color ink. The ink tank 106 is connected with the print head 105 corresponding to each color by a tube and ink is supplied. The ink tank 106 and the tube exist for each color of the ink jet head, but for simplicity, in FIG. 1, the only one ink tank and the only one tube are shown schematically.

In the print head 105, the line heads in respective colors (in the present embodiment, six colors) are put side by side along the conveyance direction b at the time of printing. Each color line head may be one formed by a signal nozzle chip seamlessly or one in which divided nozzle chips are regularly put side by side, such as in a one-line array or in a staggered array. The print head 105 in the present embodiment is a so-called full multihead in which nozzles are put side by side in the range that covers the width of the maximum size sheet that the image forming apparatus 100 can print. The ink jet scheme in which ink is ejected from a nozzle can employ a scheme that uses heat-generating elements, a scheme that uses piezo elements, a scheme that uses electrostatic elements, a scheme that uses MEMS elements, and so on. Based on print data, ink is ejected from the nozzle of each head. In the present embodiment the printer is not limited to an ink jet printer and the present embodiment can be applied to a variety of printing-scheme printers, such as a thermal printer (dye-sublimation printer, thermal transfer printer, and so on), a dot impact printer, an LED printer, and a laser printer.

A sheet on which an image is formed by the print head 105 is conveyed up to the scanner unit 107 by the rotary roller 104. It is possible for the scanner unit 107 to check whether or not there is a problem in a printed image, or to check the state of the image forming apparatus 100 by reading the printed image and a special pattern. Further, it is also possible for the scanner unit 107 to read the state of the backside facing the printed side and to detect a deviation in the printing position between the surface and the backside by using a predetermined pattern.

The sheet conveyed from the scanner unit 107 advances in the direction of an arrow c by the rotary roller 104 and is conveyed to the drying unit 108. The drying unit 108 is a unit configured to apply heat to a sheet passing through the inside of the unit with warm air in order to dry a sheet to which ink is attached in a short time.

The sheet having passed through the drying unit 108 advances in the direction of an arrow d and is conveyed to the reversion unit 109. The reversion unit 109 reverses the surface and the backside of the sheet that passes through. As the method of reversing a sheet, there are a switch back method, a method of slowly twisting the conveyance path, and so on. The switch back method requires the movement of a sheet to suspend temporarily, but the method of twisting the conveyance path can keep the conveyance speed constant, and therefore, is appropriate for high-speed printing.

The sheet having passed through the reversion unit 109 advances in the direction of an arrow e and at this point in time, the state is entered where the surface and the backside are reversed. After this, the sheet further advances in the direction of an arrow f and passes again under the print head 105.

As described above, the path indicated by the arrows b, c, d, e, and f is a path along which a sheet circulates and each time a sheet circulates the full path, the surface and the backside are reversed. The number of sheets that can exist simultaneously on this circulating path is referred to as the number of circulatable sheets in the present specification. The number of circulatable sheets changes depending on the sheet size. For example, in the case where the number of circulatable sheets of A3 size is three, this means that it is possible to convey up to three sheets of A3 size on the path indicated by the arrows b, c, d, e, and f at the same time.

On the other hand, the sheet for which printing has been completed branches in the direction of an arrow g without passing through the reversion unit 109 and is conveyed to the sort unit 110. That is, in the case of one-side printing, the sheet branches in the direction of the arrow g on the way of the circulation of the circulation path for the first time and in the case of both-side printing, the sheet branches in the direction of the arrow g on the way of the circulation of the circulation path for the second time. The sort unit 110 accumulates the sheet on a sheet discharge tray 111 corresponding to a tray number set for each printed image while checking the printed image by a sensor.

The sort unit 110 selects a tray on which sheets are accumulated in accordance with the setting of sheet discharge for each job or for each copy from among a plurality of trays (in the present embodiment, five trays). The tray in the present embodiment includes the sheet discharge tray 111 for discharging a sheet for which printing has been completed successfully and a sheet disposal tray 112 for disposing of a sheet used for maintenance and a sheet of poor print quality. The sheet that branches in the direction of an arrow h by the sort unit 110 is conveyed to the sheet discharge tray 111 and the sheet that branches in the direction of an arrow i is conveyed to the sheet disposal tray 112.

The operation unit 114 is a unit for a user to check which tray the sheet for which printing has been completed is accumulated on and a printing situation for each print job, such as a printing-in-progress situation, a printing completed situation, and a situation in which an error has occurred. Further, it is possible for a user to check the state of the apparatus, such as the ink remaining amount and the number of remaining sheets and to perform maintenance of the apparatus, such as head cleaning, via the operation unit 114.

A sheet sensor 115 determines whether a sheet within the path has reached. In the case where the sheet has reached the sheet sensor 115, sheet feed from the sheet feed tray is prohibited from being performed. It is possible to arrange a plurality of the sheet sensors 115 and to change the location of the sensor to be used for determination depending on the size of a sheet to be printed and the conveyance speed.

Figure 8:
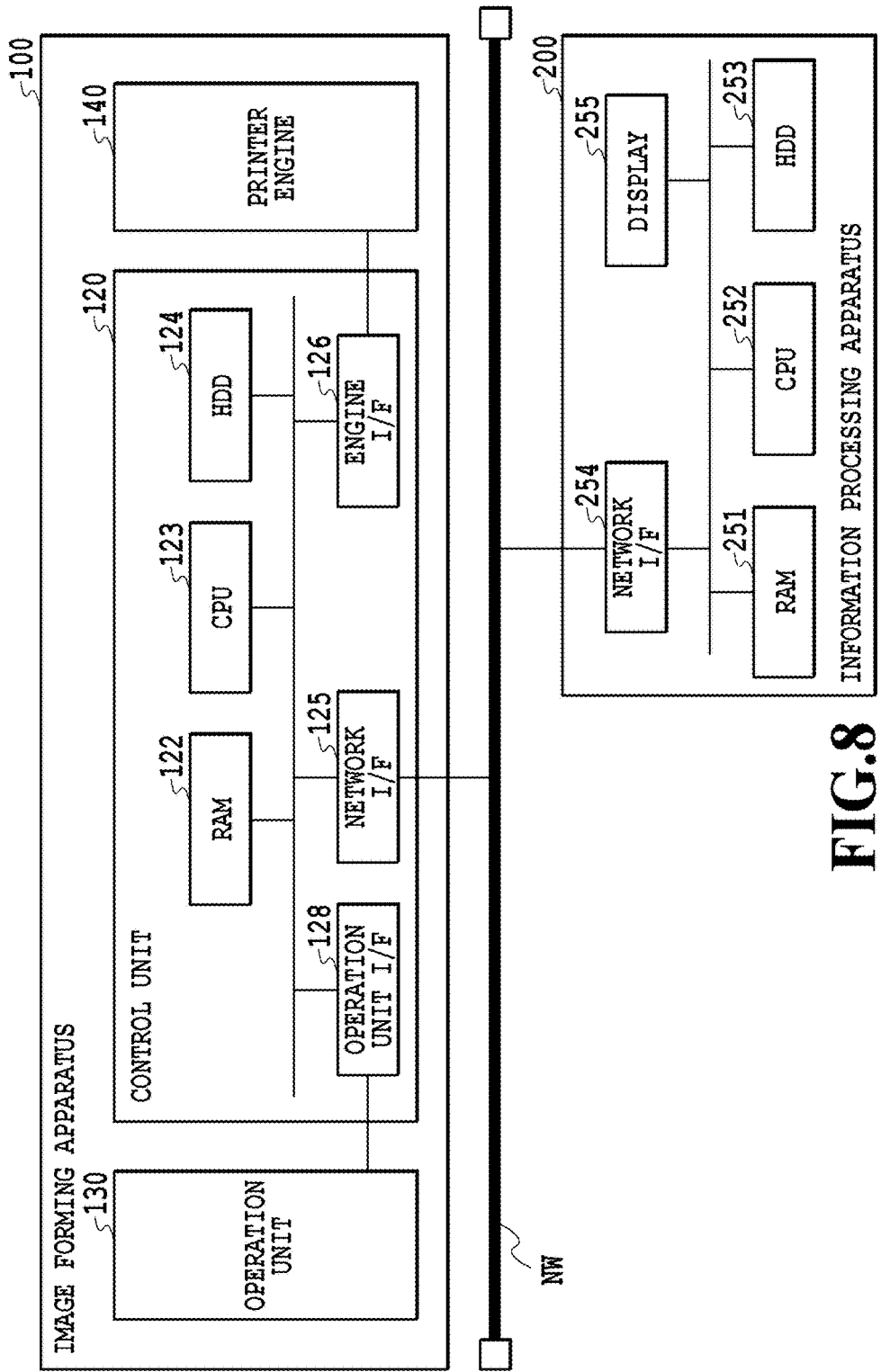
FIG. 8 is a diagram showing a hardware configuration of the image forming apparatus and an information processing apparatus in the first embodiment.

FIG. 8 is a diagram showing a hardware configuration of the image forming apparatus 100 and an information processing apparatus 200 in the present embodiment. The image forming apparatus 100 of the present embodiment includes a control unit 120 configured to govern various kinds of control of the image forming apparatus 100, and a printer engine 140. Further, the control unit 120 includes a RAM 122, a CPU 123, an HDD 124, a network I/F 125 ("I/F" means interface), an engine I/F 126, and an operation unit I/F 128. The printer engine 140 and the control unit 120 are connected via the engine I/F 126, and an operation unit 130 and the control unit are connected via the operation unit I/F 128, respectively. As will be described later, the image forming apparatus 100 and the information processing apparatus 200 are connected also by a print data dedicated line, in addition to via a network I/F.

The RAM 122 is a volatile memory and onto which programs of each function block stored in the HDD at the time of power on are developed. Further, the RAM 122 is used as a primary storage area to store information that is read and written at a high speed in each function block. Furthermore, the RAM 122 stores print data (image data) transmitted from the information processing apparatus 200, print data for which processing has already been performed and which is transmitted to a print engine unit, and so on. The CPU 123 is a calculation processor that executes the programs of each function block developed onto the RAM 122. The HDD 124 is a storage device capable of storing a large amount of information and is used as a secondary storage area to store programs of each function block and application data. The network I/F 125 performs communication with the information processing apparatus 200 via a network NW. The engine I/F 126 outputs image data in a format dependent on the printer engine 140 to the printer engine 140. The printer engine 140 drives each unit shown in FIG. 1 and drives a sheet feed mechanism, such as a conveyance roller 102, as well as printing an image on a sheet based on the image data and feeds a sheet from the sheet feed unit 101 to the conveyance path. The operation unit I/F 128 performs communication with the operation unit 130. The operation unit 130 is able to receive input instructions by a user operation as described above and also functions as a display unit configured to present the discharge destination tray of a sheet and the state of the image forming apparatus 100, such as the printing-in-progress state, the printing completed state, and the state where an error has occurred.

The information processing apparatus 200 includes a RAM 251, a CPU 252, an HDD 253, a network I/F 254, and a display 255. The RAM 251 is a volatile memory and onto which the programs of each function block stored in the HDD 253 at the time of power on are developed. Further, the RAM 251 is used as a primary storage area to store information that is read and written at a high speed in each function block. The CPU 252 is a calculation processor that executes the programs of each function block developed onto the RAM 251. The HDD 253 is a storage device capable of storing a large amount of information and is used as a secondary storage area to store the programs of each function block and application data. The network I/F 254 performs communication with the image forming apparatus 100 and another information processing apparatus (not shown schematically) via the network NW. It is possible for the display 255 to display an image that is printed by the image forming apparatus 100 as well as displaying a screen at the time of power on and at the time of the activation of application.

The information processing apparatus 200 of the present embodiment issues a print job to the image forming apparatus 100. Further, the information processing apparatus 200 generates image data to be printed. Image data for printing is, for example, common bitmap data. It is possible for the information processing apparatus 200 to generate intermediate data and the above-described bitmap data by receiving PDL data input by another information processing terminal (not shown schematically) and interpreting a drawing command of the PDL. That is, the information processing apparatus 200 of the present embodiment plays a role to perform RIP (Raster Image Processing) in the printing system shown in FIG. 8.

Figure 2:
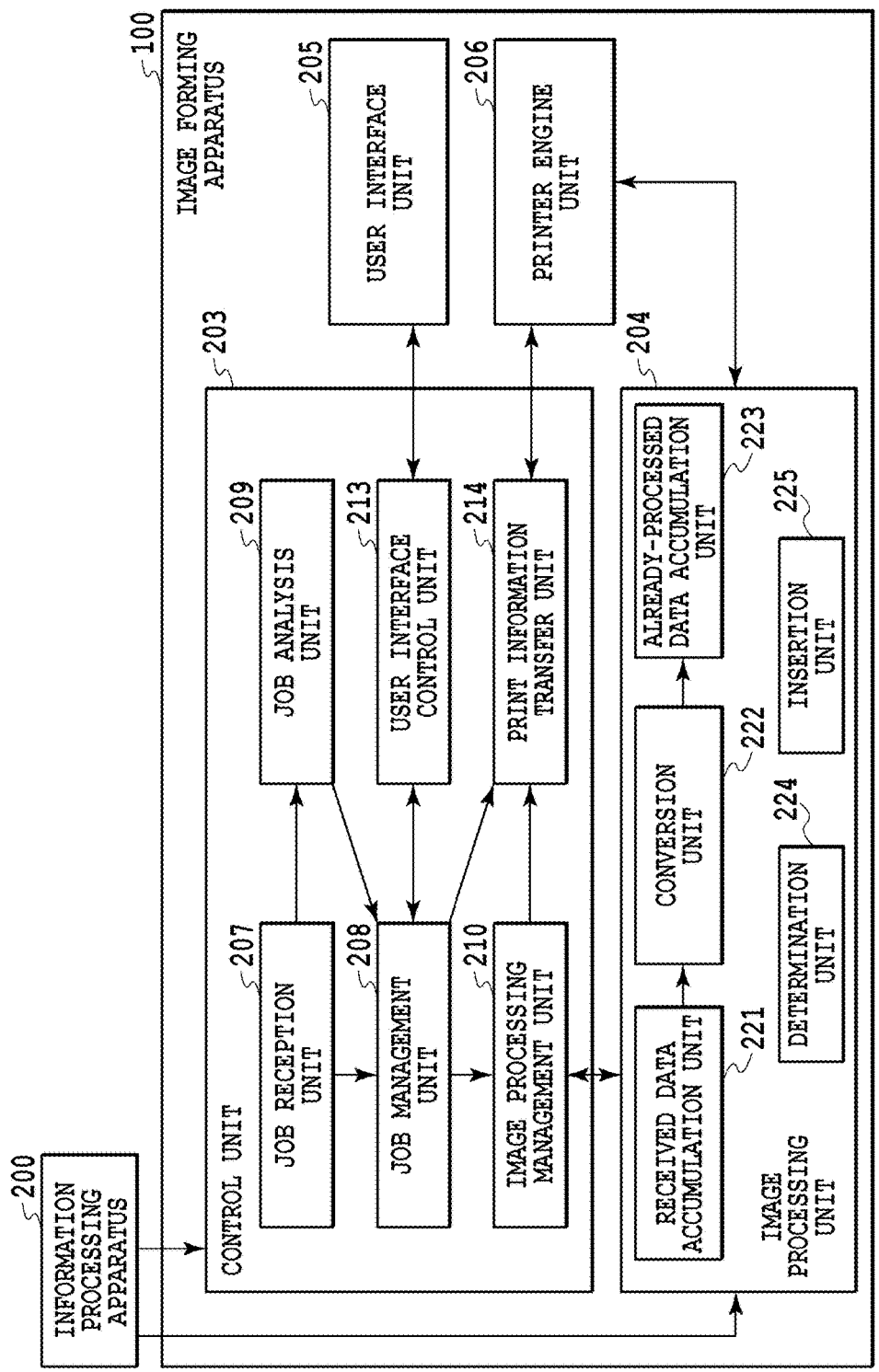
FIG. 2 is a block diagram showing a function configuration of the image forming apparatus in the first embodiment.

FIG. 2 is a block diagram showing a function configuration of the image forming apparatus 100 in the present embodiment. The image forming apparatus 100 forms an image on a sheet based on a print job received from the information processing apparatus 200, such as a PC and a server. A print job includes print setting information and print data. The print setting information includes, for example, an identifier set to the print job, the sheet size, the sheet type, the one-side/both-side printing setting, the printing resolution, and the number of colors to be printed. Further, the print setting information includes a job type indicating whether the print job is a job for printing, a job for maintenance, or the like, and the color/monochrome setting. The print data is image data for each page. In one print job, one print setting and a plurality of pieces of print data corresponding to the number of pages to be printed are included.

The image forming apparatus 100 includes a control unit 203, an image processing unit 204, a user interface unit 205, and a printer engine unit 206.

The control unit 203 analyzes the print job received from the information processing apparatus 200. Further, the control unit 203 delivers image data in the print job to the image processing unit 204. The image processing unit 204 generates print data dependent on the image forming apparatus 100 from the delivered image data and transmits the print data to the printer engine unit 206. Further, the control unit 203 acquires the results of the analysis of the print job and the print setting information for each page based on the instructions input by a user via the user interface unit 205. Then, the control unit 203 creates a command to give instructions to perform printing based on the print setting information for each page and transmits the command to the printer engine unit 206. Details of the control unit 203 and the image processing unit 204 will be described later.

The user interface unit 205 includes the operation unit 114 shown in FIG. 1 and the like and receives instructions from a user and displays the state of the image forming apparatus 100. The printer engine unit 206 includes the print head 105 shown in FIG. 1 and the like and performs printing on a sheet, such as an appropriate-sized cut sheet, based on the print setting information transmitted by the control unit 203 and the print data transmitted by the image processing unit 204

In the following, the control unit 203 is explained in detail. The control unit 203 has a job reception unit 207, a job analysis unit 209, a job management unit 208, an image processing management unit 210, a user interface control unit 213, and a print information transfer unit 214.

The job reception unit 207 receives a print job from the information processing apparatus 200 and inputs image data in the print job to the image processing unit 204.

The job analysis unit 209 analyzes the received print job and notifies the job management unit 208 of the results of the analysis. Here, the results of the analysis include the print setting information for each page of the image data in the print job, the processing contents performed by the image processing unit 204, and so on.

The job management unit 208 manages a print job. Specifically, the job management unit 208 gives instructions to performs image processing for each page of image data and to transmit the print data for which the image processing has been performed to the printer engine unit 206 in a predetermined order to the image processing unit 204 via the image processing management unit 210. Further, the job management unit 208 notifies the print information transfer unit 214 of the print setting information acquired from the job analysis unit 209 and/or the user interface control unit 213. Then, the job management unit 208 gives instructions to generate a command to specify printing for each page and to transmit the commands to the printer engine unit 206 in a predetermined order to the print information transfer unit 214.

The image processing management unit 210 gives instructions to perform necessary image processing in accordance with the instructions from the job management unit 208 to the image processing unit 204.

The print information transfer unit 214 creates a command to give instructions to perform printing based on the print setting information and transmits the command to the printer engine unit 206.

In the following, the image processing unit 204 is explained in detail. The image processing unit 204 has a received data accumulation unit 221, a conversion unit 222, an already-processed data accumulation unit 223, a determination unit 224, and an insertion unit 225. In the present embodiment, the image data in the print job received from the information processing apparatus 200 is bitmap data. The bitmap data is written to the received data accumulation unit 221 by the job reception unit 207 of the control unit 203. After the bitmap data is written to the received data accumulation unit 221, the conversion unit 222 performs image processing using the data as an input and writes the print data for which the image processing has already been performed to the already-processed data accumulation unit 223. The image processing performed by the conversion unit 222 includes, for example, processing to convert bitmap data into print data dependent on the image forming apparatus 100, and the like. After this, the print data for which the image processing has already been performed and which is written to the already-processed data accumulation unit 223 is transmitted to the printer engine unit 206. The determination unit 224 compares the amount of data written to the received data accumulation unit 221 with the amount of data written to the already-processed data accumulation unit 223 and determines whether or not a delay in the image processing has occurred. In the case where it is determined that a delay in the image processing has occurred, the insertion unit 225 inserts printing of a spare ejection pattern for maintenance.

It is possible to configure the determination unit 224 so as to acquire the number of received pages (number of pages of image data) and the number of already-processed pages (number of pages of print data) of the image processing unit 204 by making an inquiry to a received page number measurement unit and an already-processed page number measurement unit. The received page number measurement unit is configured so as to convert the data amount of the image data (bitmap data) written to the received data accumulation unit 221 of the image processing unit 204 into the number of pages and to store the number of pages. The received page number measurement unit performs page conversion by calculating the quotient obtained by dividing the amount of data written to the received data accumulation unit 221 by the size of the image data corresponding to one page. The already-processed page number measurement unit is configured so as to convert the data amount of the print data for which the image processing has already been performed and which is written to the already-processed data accumulation unit 223 of the image processing unit 204 into the number of pages and to store the number of pages. The already-processed page number measurement unit performs page conversion by calculating the quotient obtained by dividing the amount of data written to the already-processed data accumulation unit 223 by the size of the print data corresponding to one page. Although the received page number measurement unit and the already-processed page number measurement unit are not shown in FIG. 2, it is possible to design a configuration in which the received page number measurement unit and the already-processed page number measurement unit are included in, for example, one of the control unit 203 and the image processing unit 204.

In the present embodiment, it is possible to set one of an on-the-fly valid mode and an on-the-fly invalid mode as the operation mode of the image processing of the image forming apparatus 100. In the on-the-fly invalid mode, the image forming apparatus 100 generates print data after the reception of a print job is completed. On the other hand, in the on-the-fly valid mode, the image forming apparatus 100 immediately performs image processing for received image data and transmits the image data to the printer engine side. Specifically, the image forming apparatus 100 delivers the received image data to the image processing unit 204, writes the image data by using the received data accumulation unit 221 as a buffer, and transmits the data for which the image processing has been performed to the printer engine unit 206 after writing the data to the already-processed data accumulation unit 223. That is, the image forming apparatus 100 generates print data from image data while receiving a print job, i.e., each time the image data corresponding to one page is received. The on-the-fly valid mode is suitable to increase the speed of first printing, for example, in the case of printing in which each page is regarded as a printed product, such as single-photo printing. In the case where the on-the-fly valid mode is made use of, data out is more likely to occur than in the case where the on-the-fly invalid mode is made use of, and therefore, it is necessary to prevent print suspension in particular.

In the following, data making up a print job according to the present embodiment is explained. FIG. 3A is a diagram showing data making up a print job 300. The print job 300 includes image data 301 (301a to 301c) and image information 302 on the image data. The print job 300 is received from the information processing apparatus 200.

The image information 302 includes, for example, information on the image data for each page and information indicating printing conditions thereof and is analyzed by the job analysis unit 209. Here, as the information indicating printing conditions, mention is made of the printing quality (high-speed printing mode, photo printing mode, standard printing mode, and so on), the printing setting, such as the sheet type, and so on. It is possible to make up the image information 302 by, for example, electronic data in the XML (Extensible Markup Language) format, but the format is not limited to this and another format that is analyzed by the job analysis unit 209 may be used. The image information 302 may be a command specified separately by the information processing apparatus 200 or another external device in place of being included in the print job 300, or may be a set value that is input from the operation unit 114.

The image data 301 is, for example, three photo images and made up of three unit images (corresponding to three pages). The image data 301a of the first page (page no. 1) is a photo image specified to be printed with, for example, a width of 200 mm and a height of 250 mm and the data size is 400 MB and the corresponding data size of the print data for which the image processing has already been performed is 500 MB. The image data 301b of the second page (page no. 2) and the image data 301c of the third page (page no. 3) are shown so as to have the same image information, but it may also be possible to have different image information. Each piece of the image data 301 is printed in the order of the page no. Here, the aspect is illustrated in which the above-described image data 301 includes the three photo images, but the image data 301 may be a postcard or what forms one printed product by a plurality of photo images, such as a photo book.

Figure 3B:
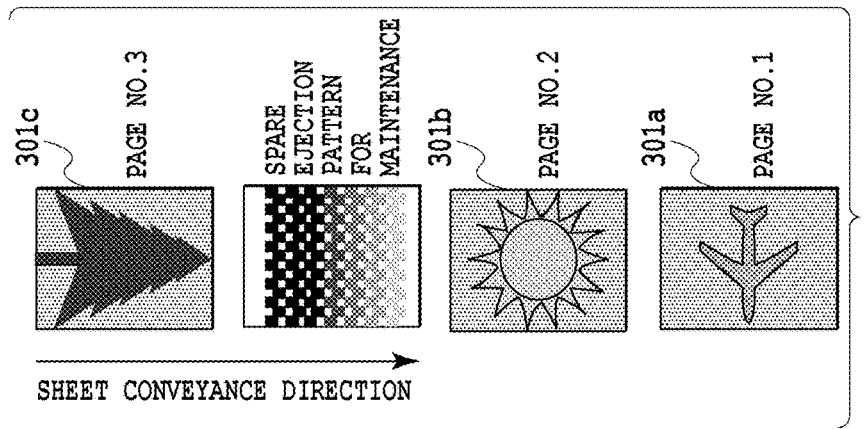
FIGS. 3A and 3B are diagrams showing a relationship between a print job, and a printed product and a non-printed product.
Figure 3A:
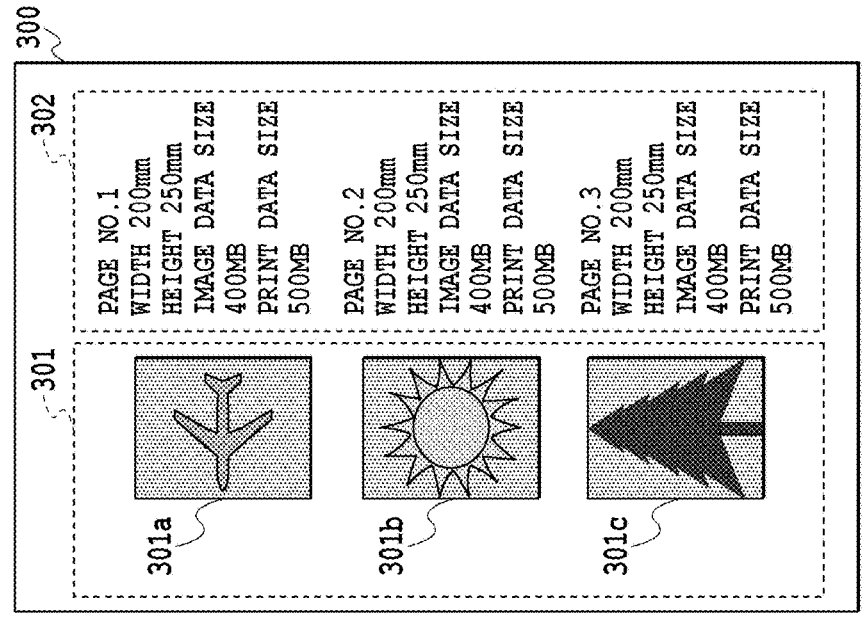

FIG. 3B is a diagram showing the way the print job 300 is printed on a continuous sheet. From the top page, in the order of the page no., the image data 301a, the image data 301b, and an auxiliary pattern (spare ejection pattern for head maintenance) are printed, and following this, the image data 301c is printed in this order. The pattern for maintenance is a non-printed product and disposed of because of not being an article of commerce.

Next, with reference to FIG. 3A and FIG. 3B, "data out" in which the data to be printed by the printer engine unit 206 runs out resulting from a delay in image processing is explained. In the case where data out occurs, the printing operation is obliged to suspend despite that printing on a sheet has not been completed.

In the case where the image data 301 in the print job 300 received from the information processing apparatus 200 is written to the received data accumulation unit 221 of the image processing unit 204, the image processing unit 204 sequentially generates print data in the order from the image data 301a. The generated print data is controlled so as to be sequentially output onto a printing sheet having been cut to the same size.

Here, the case is explained where the time of the image processing performed by the conversion unit 222 of the image processing unit 204 is extremely longer than the time of the image processing required for the image data 301a and the image data 301b after the image data 301c is written to the received data accumulation unit 221. In the case where the image processing of the image data 301a and the image data 301b is completed and printing is performed, the image data 301a and the image data 301b are discharged to the sheet discharge tray 111 as they are and regarded as being the printed product. However, a case occurs where the image processing of the image data 301c has not been completed yet in the subsequent stage where printing of the image data 301c is started. As the cause of that the image processing has not been completed, mention is made of that the time required for the image processing is long because the data amount of the image data 301c is large, that the communication rate between the information processing apparatus 200 and the control unit 13 is reduced due to network factors and the data reception has taken much time, and so on.

Figure 4:
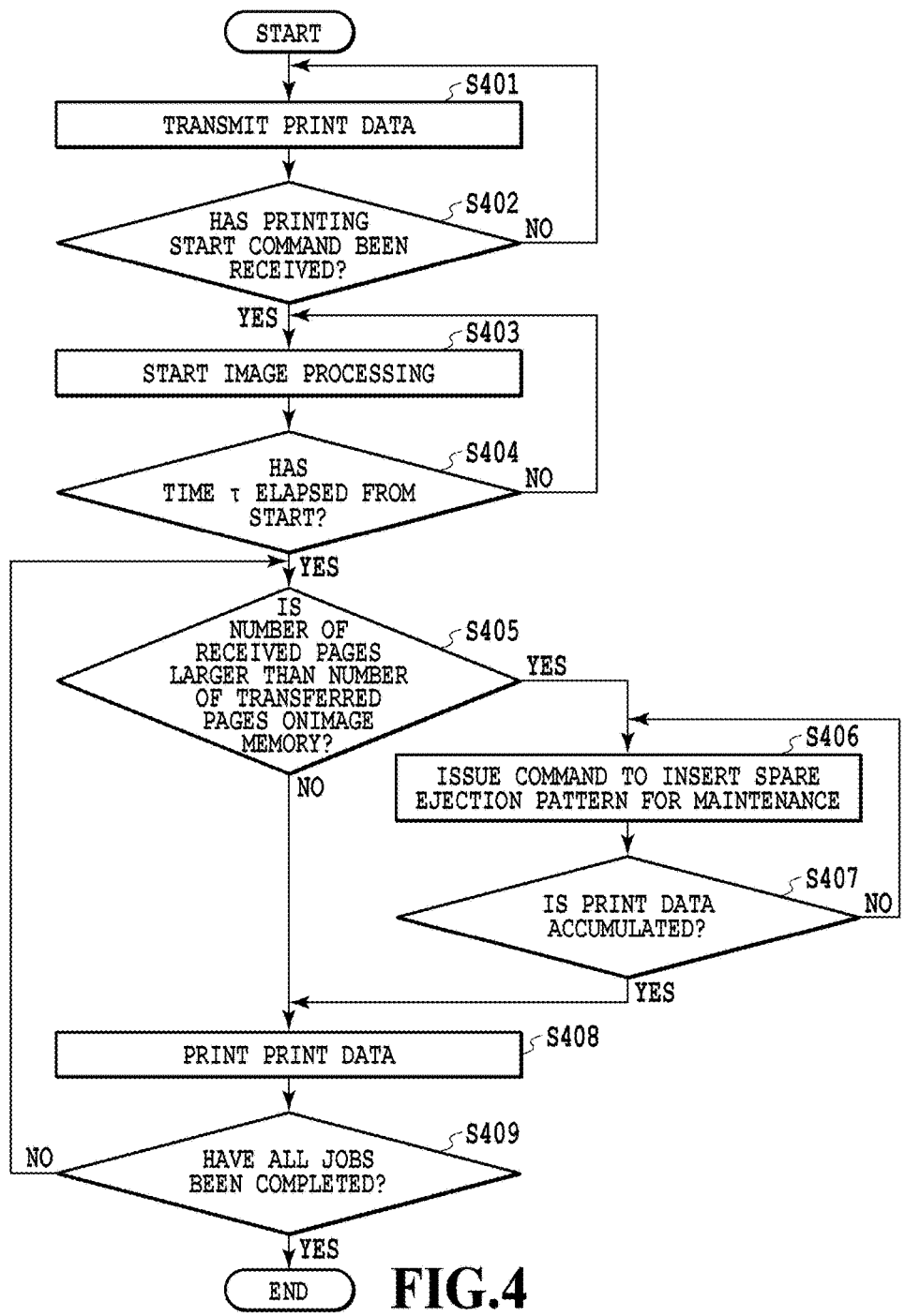
FIG. 4 is a flowchart showing a printing control sequence in the first embodiment.

FIG. 4 is a flowchart showing a printing control sequence in the present embodiment and shows the entire sequence of the printing operation controlled by the control unit 113.

Based on the printing instructions, at step S401, the control unit 203 starts to receive the print job 300 from the information processing apparatus 200 and transmits image data to the image processing unit 204. That is, the image data of the received print job 300 is written to the received data accumulation unit 221. At this time, the amount of the image data that is written to the received data accumulation unit 221 is smaller than or equal to the amount that the received data accumulation unit 221 can save and there is a case where the image data that is written to the received data accumulation unit 221 is part of the image data received from the information processing apparatus 200. That is, for example, in the case where the image data of the print job 300 received from the information processing apparatus 200 includes 30 pages and the amount that that received data accumulation unit 221 can save is an amount corresponding to five pages, the image data is saved in the received data accumulation unit 221 in the amount corresponding to five pages each time. The processing advances to step S402.

At step S402, the image processing unit 204 stands by while determining whether or not a command to start printing has been received from the control unit 203 and in the case where a command to start printing has not been received, the processing advances to step S401 and in the case where a command to start printing has been received, the processing advances to step S403.

At step S403, the image processing unit 204 starts image processing by the conversion unit 222. After this, the processing advances to step S404.

At step S404, the image processing unit 204 determines whether or not a predetermined time τ has elapsed after the start of printing or the completion of printing. In the case where the predetermined time τ has elapsed, the processing advances to step S405 and in the case where the predetermined time τ has not elapsed yet, the processing advances to step S403. Here, the predetermined time τ is determined based on the data amount of image data that is newly accumulated in the received data accumulation unit 221. That is, in the present embodiment, the predetermined time τ changes in accordance with the data amount of image data. Specifically, the predetermined time τ is set to a value longer than or equal to the time taken by the conversion unit 222 to perform conversion processing for the image data that is newly accumulated in the received data accumulation unit 221. Further, it may also be possible to set the predetermined time τ to a value obtained by adding a predetermined margin time to the time taken for the conversion processing. For example, in the case where the received data accumulation unit 221 can accumulate image data corresponding to five pages and the received data accumulation unit 221 has received image data corresponding to three pages at S401, the predetermined time τ is set to the time taken by the conversion unit 222 to convert the image data corresponding to three pages.

At step S405, the determination unit 224 in the image processing unit 204 acquires the number of received pages and the number of already-processed pages of the image processing unit 204 by making an inquiry to the received page number measurement unit and the already-processed page number measurement unit. Then, the determination unit 224 compares the acquired number of received pages with the acquired number of already-processed pages and determines whether or not the number of already-processed pages is smaller than the number of received pages. In other words, at S405, whether a delay of print data has occurred is determined based on the number of received pages and the number of already-processed pages. Here, the state where a delay of print data has occurred refers to a possibility that the data out of print data occurs. Here, the "number of received pages" is the number of pages of the image data that the received data accumulation unit 221 has newly received at S401, i.e., the number of pages of the image data that is newly accumulated in the received data accumulation unit 221. The "number of already-processed pages" is the number of already-processed pages of the number of pages of the image data that is newly accumulated in the received data accumulation unit 221. The number of already-processed pages does not exceed the number of received pages, and therefore, there are only a case where the number of already-processed pages is smaller than the number of received pages and a case where the number of received pages and the number of already-processed pages are equal. In the case where it is determined that the number of received pages is larger than the number of already-processed pages at this step, i.e., in the case where the processing of the number of received pages has not been completed despite that the predetermined time τ has elapsed, the processing advances to step S406. In the case where it is determined that the number of received pages is smaller than or equal to the number of already-processed pages, the processing advances to step S408.

At step S409, the image processing unit 204 determines whether all the print jobs have been completed. In the case where all the print jobs have not been completed, the image processing unit 204 advances the processing to step S405 and in the case where all the print jobs have been completed, the image processing unit 204 terminates the printing operation.

The number of received pages and the number of already-processed pages in the present embodiment are specifically defined as follows.

number of received pages=integer part of (data amount of image data written to received data accumulation unit÷size of image data corresponding to one page)

number of already-processed pages=integer part of (data amount of print data written to already-processed data accumulation unit after image processing÷size of print data corresponding to one page)

Further, information necessary to calculate (specify) the number of received pages and the number of already-processed pages is acquired from the image information 302. In the present embodiment, according to the image information 302 in the print job, the size of the bitmap data corresponding to one page of A4 size is 400 MB, which is the same for each page. In the case where the total data amount of the bitmap data written to the received data accumulation unit 221 is 1,200 MB, 1,200 MB÷400 MB=3, and therefore, the number of received pages is three. Further, according to the image information 302, the size of the print data corresponding to one page is 500 MB, which is the same for each page. In the case where the total data amount of the print data for which the image processing has already been performed and which is written to the already-processed data accumulation unit 223 is 1,000 MB, 1,000 MB÷500 MB=2, and therefore, the number of already-processed pages is two.

Figure 5:
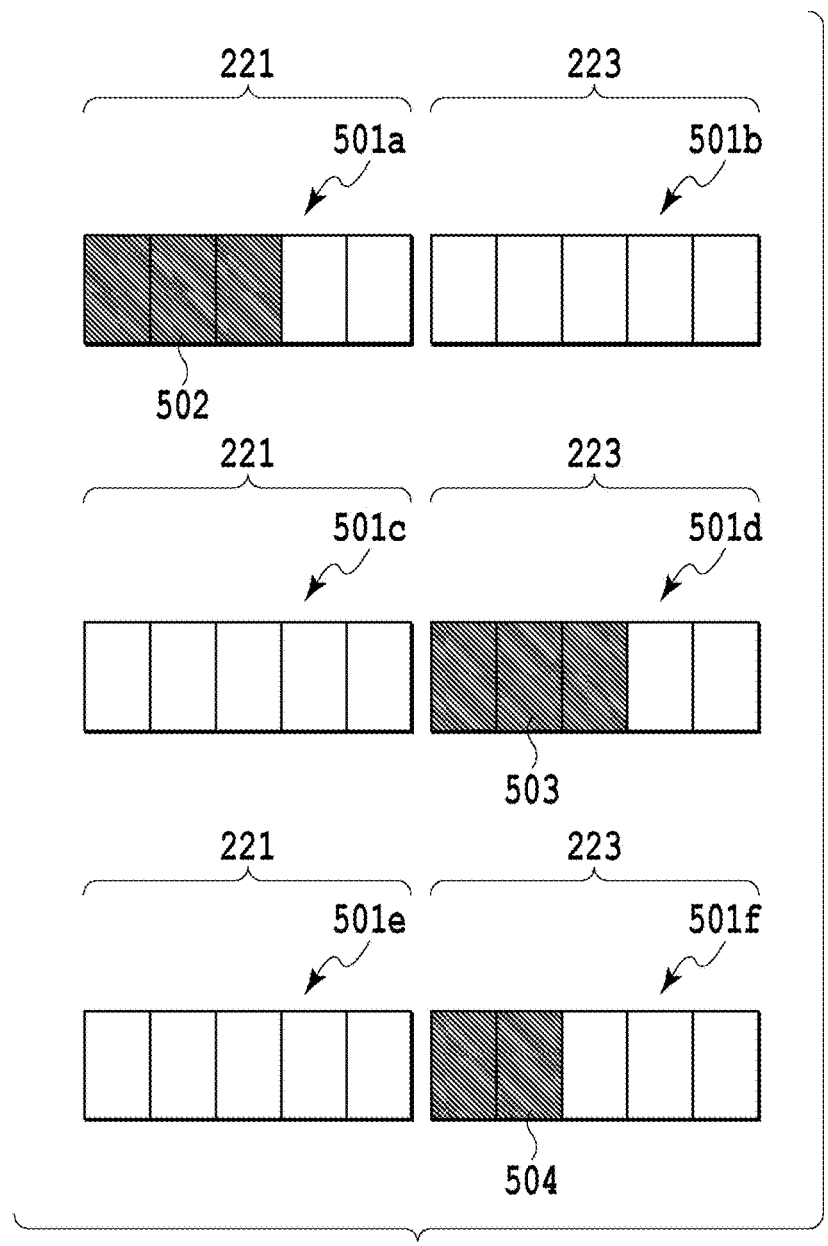
FIG. 5 is a diagram showing states of a received data accumulation unit and an already-processed data accumulation unit in the first embodiment.

FIG. 5 schematically shows the image data of the bitmap data for printing written to the received data accumulation unit 221 and the print data written to the already-processed data accumulation unit 223. In FIG. 5, the shaded portion indicates the state where data is written and the unshaded portion indicates the state where data is not written. Further, one rectangle indicates data corresponding to one page. In the following, with reference to FIG. 5, the determination processing at step S405 is explained in detail.

A state 501a shows the state where bitmap data is written to the received data accumulation unit 221 before the image processing by the conversion unit 222. A state 501b shows the state where print data does not exist yet in the already-processed data accumulation unit 223 before the image processing by the conversion unit 222.

A state 501c and a state 501d show the state of the received data accumulation unit and the state of the already-processed data accumulation unit, respectively, after the image processing by the conversion unit 222. The state 501c shows the state of the received data accumulation unit 221 where the written image data has been cleared after being used in the image processing. The state 501d shows the state of the already-processed data accumulation unit 223 where the image processing is completed and the print data, which is the results of the image processing, is written.

A state 501e and a state 501f show the state of the received data accumulation unit and the state of the already-processed data accumulation unit, respectively, after the image processing, similar to the state 501c and the state 501d. The state 501e shows the state of the received data accumulation unit 221 where the written image data has been cleared after being used in the image processing. The state 501f shows the state of the already-processed data accumulation unit 223 where the image processing is completed and the print data, which is the results of the image processing, is written.

Further, image data 502 indicates the bitmap data written to the received data accumulation unit 221 and the data amount corresponding to three pages is written. Print data 503 indicates the print data written to the already-processed data accumulation unit 223 and the data amount corresponding to three pages is written. Print data 504 indicates the print data written to the already-processed data accumulation unit 223 and the data amount corresponding to two pages is written.

It is assumed that the initial state of the received data accumulation unit 221 before the image processing is the state 501a. In the case of the state before the image processing, i.e., in the case where the number of pages of the newly received image data is that in the state 501a, and the state of the already-processed data accumulation unit 223 to which the print data is written is the state 501d after the predetermined time τ has elapsed, the number of received pages and the number of already-processed pages are equal. Consequently, at step S405, "No" is determined and the processing advances to step S408. In the case where "No" is determined at step S405, it is determined that a delay of print data has not occurred as a result.

On the other hand, in the case where the state of the already-processed data accumulation unit 223 to which the print data is written is the state 501*f* after the predetermined time τ has elapsed, the number of received pages is three, but the number of already-processed pages is two, and therefore, the number of already-processed pages is smaller than the number of received pages. Consequently, at step S405, "Yes" is determined and the processing advances to step S406. In the case where "Yes" is determined at step S405, it is determined that a delay of print data has occurred as a result.

In the case where "Yes" is determined at step S405, next, at step S406, the image processing unit 204 issues a command to insert a pattern for maintenance based on the results of the determination unit 224. The command to insert a pattern for maintenance may be a command to instruct the image processing unit 204 to insert a pattern for maintenance, or may be a request for insertion made to another processing unit. After the command to insert a pattern for maintenance is issued, next, the processing advances to step S407.

At step S407, the image processing unit 204 determines whether or not print data is accumulated in the already-processed data accumulation unit 223. In the case where it is determined that print data is not accumulated, the processing advances to step S406 and in the case where it is determined that print data is accumulated, the processing advances to step S408. In the case where the already-processed data accumulation unit 223 is in the state where data whose size is larger than 0 byte is written thereto, it is determined that print data is accumulated.

At step S408, the image processing unit 204 transmits the print data accumulated in the already-processed data accumulation unit 223 to the printer engine unit 206 and starts printing of the print data. At this time, an image based on the print data corresponding to the print job is printed, but in the case where the command of a pattern for maintenance is issued, the pattern for maintenance is printed. Here, as the pattern for maintenance, mention is made of, for example, a spare ejection pattern, a registration adjustment pattern, no ejection monitoring pattern, and so on. Then, in the case where the pattern for maintenance is printed, the pattern for maintenance is read by the scanner unit or the like and whether a problem has occurred in the image is determined. In the case where it is determined that maintenance processing is necessary, the maintenance processing is performed appropriately.

At step S409, the image processing unit 204 determines whether all the print jobs have been completed and in the case of determining "Yes", the image processing unit 204 terminates the printing operation. In the case of determining that all the print jobs have not been completed yet, the image processing unit 204 advances the processing to step S405.

As described above, according to the image forming apparatus of the present embodiment, in the case where it is determined that a delay in the image processing has occurred, the printing operation is made to be performed in time by dynamically inserting a pattern for maintenance, and thereby, it is possible to prevent printing suspension while implementing high productivity of printed products. In particular, in the case of an ink jet printing apparatus, a pattern for maintenance is printed periodically and whether a problem has occurred in an image is determined and the maintenance processing is performed in accordance with the necessity. That is, it is necessary for the image forming apparatus to print the pattern for maintenance held in advance randomly or at fixed intervals in order to keep the print quality in image formation. In contrast to this, in the present embodiment, in the case where printing is not performed in time, the pattern for maintenance is inserted, and thereby, it is possible to reduce the number of times of maintenance processing. The timing at which the pattern for maintenance is inserted in the normal operation is not limited in particular, and for example, the insertion is performed for each predetermined number of lines, at every predetermined times, and so on. For example, in the case where the pattern for maintenance is inserted at S406, it is sufficient to perform the next insertion of the pattern for maintenance in the stage where predetermined conditions (predetermined number of lines, predetermined time) are satisfied after the timing of printing of the pattern for maintenance based on step S406. That is, it is sufficient to clear the count once in the stage of printing of the pattern for maintenance based on step S406. Due to this, it is possible to suppress the printing operation from being suspended with almost no increase in the number of times of insertion of the pattern for maintenance.

Second Embodiment

In the present embodiment, an example of the form in which a command to insert a pattern for maintenance as an auxiliary pattern is issued.

Figure 6:
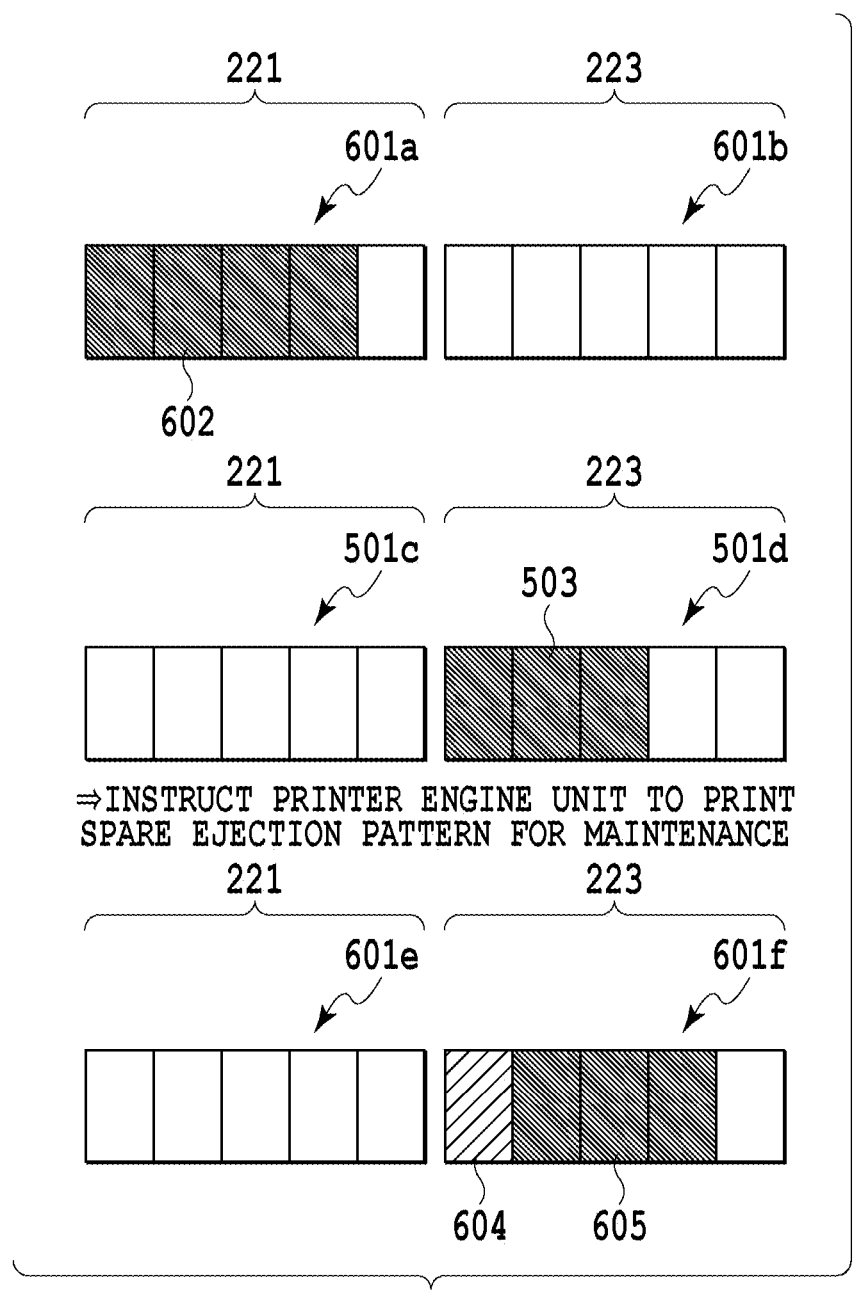
FIG. 6 is a diagram showing states of a received data accumulation unit and an already-processed data accumulation unit in a second embodiment.

FIG. 6 schematically shows image data (bitmap data) written to the received data accumulation unit 221 and print data written to the already-processed data accumulation unit 223. The states 501*c* and 501*d* and the print data 503 shown in FIG. 6 are the same as those explained in FIG. 5, and therefore, detailed explanation is omitted here.

A state 601*a* shows the state where bitmap data is written to the received data accumulation unit 221 before the image processing by the conversion unit 222. Image data 602 indicates bitmap data written to the received data accumulation unit 221 and the data amount corresponding to four pages is written. A state 601*b* shows the state where print data does not exist yet in the already-processed data accumulation unit 223 before the image processing by the conversion unit 222. The state before the image processing, i.e., the number of pages of the newly received image data is that in the state 601*a*. In the case where the state of the already-processed data accumulation unit 223 to which print data is written is the state 501*d* after the predetermined time τ has elapsed, the number of already-processed pages is smaller than the number of received pages, and therefore, a command to insert a pattern for maintenance is issued. At this time, as the form of issuance of a command, a command to instruct the image processing unit 204 to write the data of the pattern for maintenance to the already-processed data accumulation unit 223 is issued. In the case where the image processing unit 204 executes the command, the state of the received data accumulation unit 221 and the state of the already-processed data accumulation unit 223 become a state 601*e* and a state 601*f*, respectively.

The state 601*e* shows the state of the received data accumulation unit 221 where the written image data has been cleared after being used in the image processing. The state 601*f* shows the state of the already-processed data accumulation unit 223 where the image processing is completed and the data of the pattern for maintenance and the print data, which is the results of the image processing, are written. Data 604 in the state 601*f* indicates the data of the pattern for maintenance written to the already-processed data accumulation unit 223 and the data amount corresponding to one page is written. Print data 605 indicates the print data written to the already-processed data accumulation unit 223 and the data amount corresponding to three pages is written. The data of the remaining one page is held by the conversion unit 222.

However, the amount of the pattern for maintenance written to the already-processed data accumulation unit 223 is not limited to the amount corresponding to one page and the amount may be changed to another amount different from that corresponding to one page in accordance with the necessity. For example, it may also be possible to write the pattern for maintenance corresponding to two pages to the already-processed data accumulation unit 223.

It is possible to use the pattern for maintenance for the purposes of use, such as adjustment of the nozzle position and the chip position, complementing and monitoring of no ejection, and the reduction in unevenness in image (unevenness in density and color) accompanying the tolerance of the ejection amount of the head.

Further, by changing the size (area) of the pattern for maintenance, it is possible to change the timing (time intervals) of printing that can be adjusted by printing the pattern for maintenance. For example, by changing the size of the pattern for maintenance in correspondence to the magnitude of the difference between the number of received pages and the number of already-processed pages, it is made possible to more elaborately adjust the timing of printing.

Third Embodiment

In the first embodiment, explanation is given by defining the number of received pages and the number of already-processed pages in the determination performed by the determination unit 224 as integers. In the present embodiment, that the number of received pages and the number of already-processed pages in the determination performed by the determination unit 224 are not limited to integers is explained.

Figure 7:
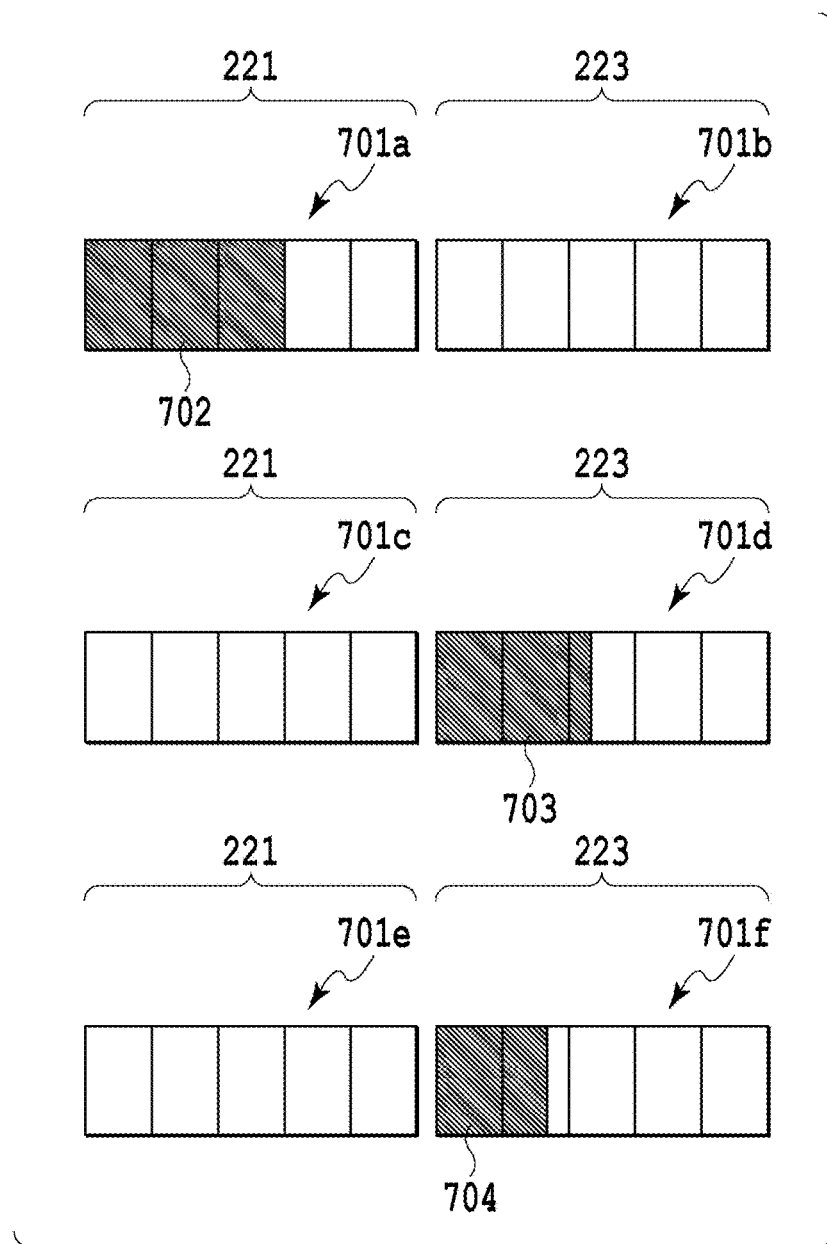
FIG. 7 is a diagram showing states of a received data accumulation unit and an already-processed data accumulation unit in a third embodiment.

FIG. 7 schematically shows image data of bitmap data for printing written to the received data accumulation unit 221 and print data written to the already-processed data accumulation unit 223. In the following, with reference to FIG. 7, determination processing in the present embodiment is explained in detail.

A state 701a shows the state where the bitmap data is written to the received data accumulation unit 221 before the image processing. A state 701b shows the state where the print data does not exist yet in the already-processed data accumulation unit 223 before the image processing.

A state 701c and a state 701d show the state of the received data accumulation unit 221 and the state of the already-processed data accumulation unit 223, respectively, after the image processing. The state 701c shows the state of the received data accumulation unit 221 where the written image data has been cleared after being used in the image processing. The state 701d shows the state of the already-processed data accumulation unit 223 where the image processing is completed and the print data, which is the results of the image processing, is written.

A state 701e and a state 701f show the state of the received data accumulation unit 221 and the state of the already-processed data accumulation unit 223, respectively, after the image processing, similar to the state 701c and the state 701d. The step 701e shows the state of the received data accumulation unit 221 where the written image data has been cleared after being used in the image processing. The state 701f shows the state of the already-processed data accumulation unit 223 where the image processing is completed and the data of the pattern for maintenance and the print data, which is the results of the image processing, are written. Further, image data 702 indicates the bitmap data written to the received data accumulation unit 221 and the data amount corresponding to three pages is written. Print data 703 indicates the print data written to the already-processed data accumulation unit 223 and the data mount larger than that corresponding to two pages and smaller than that corresponding to three pages is written. Print data 704 indicates the print data written to the already-processed data accumulation unit 223 and the data mount larger than that corresponding to one page and smaller than that corresponding to two pages is written.

It is assumed that the initial state of the received data accumulation unit 221 before the image processing is the state 701a. In the case of the state before the image processing, i.e., in the state where the number of pages of the newly received image data is that in the state 701a, and the state of the already-processed data accumulation unit 223 to which the print data is written is the state 701d after the predetermined time τ has elapsed, it is assumed that the determination criteria of whether or not a delay in the image processing has occurred is $$NPages\_rev > NPages\_trans + \alpha$$

where Npages_rev is the number of received pages, Npages_trans is the number of already-processed pages, and α is a predetermined value, which is a non-integer, indicating a value larger than or equal to 0 and less than 1. In the case where this inequality holds, it is determined that a delay in the image processing has occurred and a command to insert the pattern for maintenance is issued and in the other cases, it is determined that a delay in the image processing has not occurred and a command to insert the pattern for maintenance is not issued. Here, an example is explained in which whether or not a delay in the image processing has occurred is determined on the assumption that the predetermined value α is 0.8.

In the case where the state of the already-processed data accumulation unit 223 is the state 701d, on a condition that Npages_trans is 2.3, the right side of the above-described inequality is 3.1. Because NPages_rev is 3, the results of determination of whether the inequality holds are "No", and therefore, the pattern for maintenance is not inserted.

In the case where the state of the already-processed data accumulation unit 223 is the state 701f, on a condition that NPages_trans is 1.7, the right side of the above-described inequality is 2.5. Because NPages_rev is 3, the results of determination of whether the inequality holds are "Yes", and therefore, the pattern for maintenance is inserted.

Fourth Embodiment

In the first embodiment, explanation is given on the assumption that the received data that is accumulated in the received data accumulation unit 221 is the received data in one print job. In the present embodiment, an example in which two or more pint jobs continue is explained.

Figure 9:
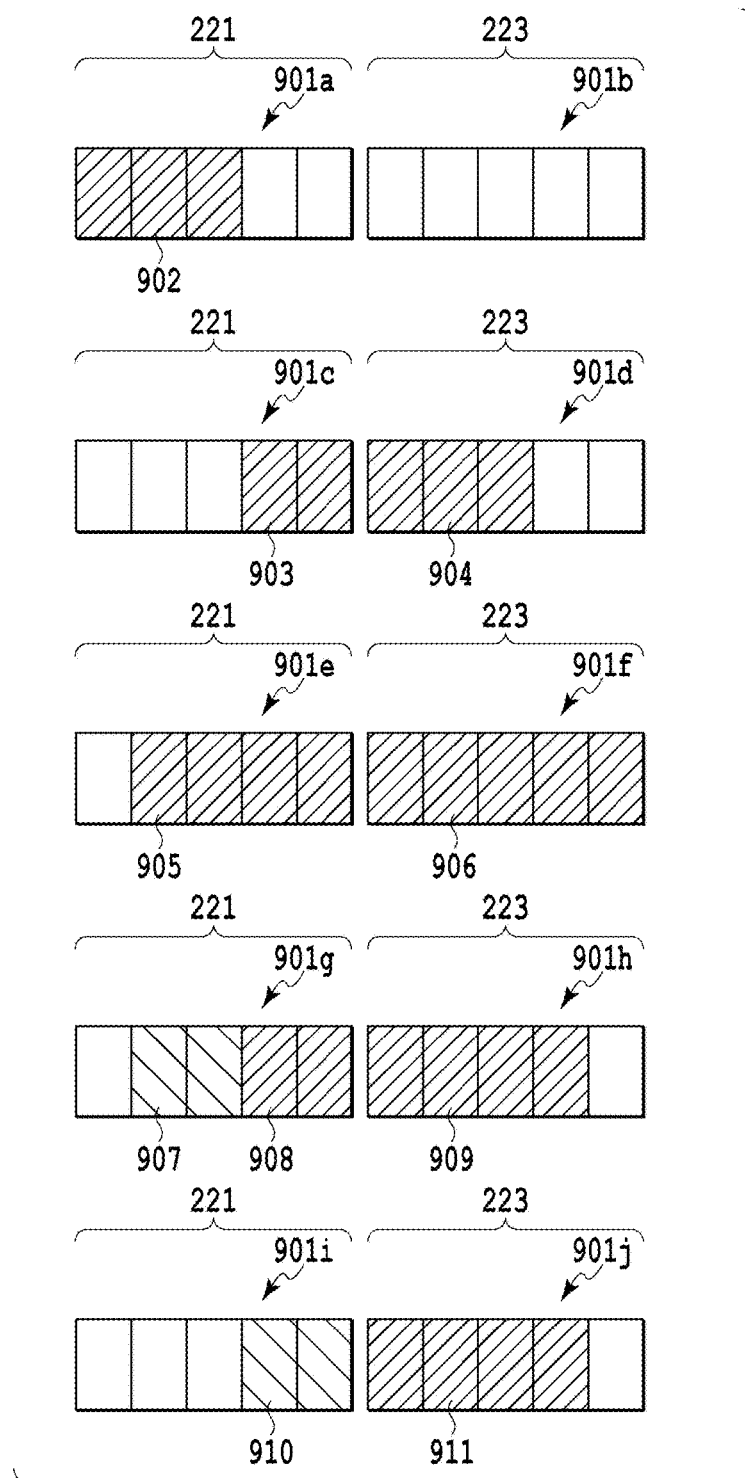
FIG. 9 is a diagram showing states of the received data accumulation unit and the already-processed data accumulation unit in the first embodiment.

FIG. 9 schematically shows image data (bitmap data) written to the received data accumulation unit 221 and print data written to the already-processed data accumulation unit 223. States 901a and 901d and print data 902 shown in FIG. 9 are the same as the states 501a and 501d and the print data 502 explained in FIG. 5, and therefore, detailed explanation is omitted here.

A state 901c shows the state where the bitmap data is written to the received data accumulation unit 221 before the image processing by the conversion unit 222 after the predetermined time τ or more has elapsed from the state 901a. The state 901d shows the print data written to the already-processed data accumulation unit 223 after the predetermined time τ or more has elapsed from a state 901b. Image data 903 indicates the image data written to the received data accumulation unit 221 and the data amount corresponding to two pages is written. Print data 904 indicates the print data, which is the already-processed data obtained by performing image processing for the image data 902 and written to the already-processed data accumulation unit 223, and the data amount corresponding to three pages is written.

A state 901e shows the state where the bitmap data is written to the received data accumulation unit 221 before the execution of the image processing by the conversion unit 222 after the state 901c. A state 901f shows the print data written to the already-processed data accumulation unit 223 after the state 901d. Image data 905 indicates the image data written to the received data accumulation unit 221 and the data amount corresponding to four pages is written. Print data 906 indicates the print data, which is the data generated by performing the image processing for the image data 903 and written to the already-processed data accumulation unit 223, and the data amount corresponding to five pages is written. The print data 906 includes both the image data 904 whose transfer to the printer engine 206 has not been completed yet and the image data 903 for which the image processing has already been completed.

A state 901g shows the state where the bitmap data is written to the received data accumulation unit 221 before the image processing by the conversion unit 222 after the state 901e. A state 901h shows the print data written to the already-processed data accumulation unit 223 after the state 901f. Image data 907 indicates the image data written to the received data accumulation unit 221 and the data amount corresponding to two pages is written. Image data 908 indicates the bitmap data written to the received data accumulation unit 221 and the data amount corresponding to two pages that wait for image processing is written. Image data 909 indicates the print data, which is the already-processed data obtained by performing image processing for the image data 905 and written to the already-processed data accumulation unit 223, and the data amount corresponding to four pages is written. The print data 909 includes the image data 906 corresponding to two pages, whose transfer to the printer engine 206 has not been completed yet, and the print data corresponding to two pages, which is generated by performing image processing for the image data 905.

A state 901i shows the state where the bitmap data is written to the received data accumulation unit 221 before the image processing by the conversion unit 222 after the state 901g. A state 901j shows the print data written to the already-processed data accumulation unit 223 after the state 901h. Image data 910 indicates the bitmap data written to the received data accumulation unit 221 and the data amount corresponding to two pages is written. Image data 911 indicates the print data written to the already-processed data accumulation unit 223 and the data amount corresponding to four pages is written. The image data 911 includes both the image data 909 whose transfer to the printer engine unit 206 has not been completed yet and the data for which the image processing has already been completed of the image data 908.

Other Embodiments

The present invention is not limited to the above-described embodiments. For example, in the above-described embodiments, the number of received pages and the number of already-processed pages are compared, but the comparison is not limited to this and it may also be possible to compare, for example, the received data size and the already-processed data size. In this case, it may also be possible to set a predetermined margin by taking into consideration the difference in size between the bitmap data before being converted by the conversion unit 222 and the print data after being converted by the conversion unit 222. That is, it may also be possible to determine whether (received data size+predetermined margin)>print data size is satisfied at S405.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

It is possible for the image processing apparatus of the present invention to prevent printing suspension while implementing high productivity of printed products.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-107946, filed May 30, 2016, and No. 2017-050005, filed Mar. 15, 2017, which are hereby incorporated by reference wherein in their entirety.

What is claimed is:
1. An image processing apparatus comprising:
at least one processor operating to:
receive image data;
generate print data from the received image data;
control to form an image on a sheet based on the generated print data;
determine, based on a difference between a data amount of the received image data and a data amount of the generated print data, whether a delay in generation of the print data has occurred; and issue a command to add pattern data which is not based on the received image data to the generated print data, according to the determination that the delay has occurred, wherein an image based on the print data, which has not been generated at the time of the determination of delay, is formed after an image based on the added pattern data.

2. The image processing apparatus according to claim 1, wherein the determination is performed based on a number of pages of image data specified by a data amount of the received image data and a number of pages of print data specified by a data amount of the generated print data.

3. The image processing apparatus according to claim 2, further comprising:

a first accumulation memory to which the received image data is accumulated;

a second accumulation memory to which the generated print data is accumulated; and wherein the at least one processor further operates to:

measure a data amount of the image data accumulated to the first accumulation memory and to calculate a number of pages of image data based on the measured data amount of image data; and measure a data amount of the print data accumulated to the second accumulation memory and to calculate a number of pages of print data based on the measured data amount of print data.

4. The image processing apparatus according to claim 3, wherein the command is a command to write data of the pattern data to the second accumulation memory.

5. The image processing apparatus according to claim 2, wherein the determination that the delay has occurred is performed in a case where a difference between the number of pages of image data and the number of pages of print data exceeds a predetermined value.

6. The image processing apparatus according to claim 2, wherein the determination that the delay has occurred is performed in a case where the number of pages of print data is smaller than the number of pages of image data.

7. The image processing apparatus according to claim 1, wherein the pattern data is pattern data for maintenance, and it is determined whether maintenance processing is necessary by reading the image formed based on the pattern data.

8. The image processing apparatus according to claim 1, wherein the pattern of the pattern data is any one of a spare ejection pattern, a registration adjustment pattern and a no ejection monitoring pattern.

9. The image processing apparatus according to claim 1, wherein, in a case where it is determined that the delay has not occurred, the command to add the pattern data to the generated print data is not issued.

10. An image processing method comprising the steps of:

receiving image data;

generating print data from the received image data;

controlling to form an image on a sheet based on the generated print data;

determining, based on a difference between a data amount of the received image data and a data amount of the generated print data, whether a delay in generation of the print data has occurred;

issuing a command to add pattern data, which is not based on the received image data, to the generated print data, according to the determination that the delay has occurred at the determining step.

11. The image processing method according to claim 10, wherein the determining is performed based on a number of pages of image data specified by a data amount of the received image data and a number of pages of print data specified by a data amount of generated print data.

12. The image processing method according to claim 11, further comprising:

accumulating the received image data in a first accumulation memory;

accumulating the generated print data in a second accumulation memory;

measuring a data amount of the image data accumulated to the first accumulation memory and calculating a number of pages of image data based on the measured data amount of the image data; and measuring a data amount of the print data accumulated to the second accumulation memory and calculating a number of pages of print data based on the measured data amount of the print data.

13. The image processing method according to claim 12, wherein the command is a command to write data of the pattern data to the second accumulation memory.

14. The image processing method according to claim 11, wherein the determining that the delay has occurred is performed in a case where the number of pages of print data is smaller than the number of pages of image data.

15. The image processing method according to claim 11, wherein the determining that the delay has occurred is performed in a case where a difference between the number of pages of image data and the number of pages of print data exceeds a predetermined value.

16. The image processing method according to claim 10, wherein the pattern data is pattern data for maintenance; and it is determined that maintenance processing is necessary by reading the image formed based on the pattern data.

17. The image processing method according to claim 10, wherein the pattern of the pattern data is any one of a spare ejection pattern, a registration adjustment pattern and a no ejection monitoring pattern.

18. The image processing method according to claim 10, wherein in a case where it is determined that the delay has not occurred, the command to add the pattern data to the generated print data is not issued.

19. A non-transitory computer readable storage medium storing a program for causing a computer to function as an image processing apparatus, the program comprising:

code for receiving image data;

code for generating print data from the received image data;

code for controlling control to form an image on a sheet based on the generated print data;

code for determining, based on a difference between a data amount of the received image data and a data amount of the generated print data, whether a delay in generation of the print data has occurred; and code for issuing a command to add pattern data, which is not based on the received image data, to the generated print data, according to the determination that the delay has occurred, wherein an image based on the print data, which has not been generated at the time of the determination of delay, is formed after an image based on the added pattern data.

* * * * *